United States Patent Office.

JOHN ROGERS AND LAURENCE REID, OF BROOKLYN, NEW YORK.

Letters Patent No. 92,751, dated July 20, 1869; patented in England, April 1, 1869.

IMPROVEMENT IN TREATING AND REVIVIFYING BONE-BLACK.

The Schedule referred to in these Letters Patent and making part of the same.

*To whom it may concern:*

Be it known that we, JOHN ROGERS and LAURENCE REID, both of Brooklyn, Kings county, State of New York, have invented an Improvement in Bone-Black; and we hereby declare that the following is a full and exact description thereof.

In the use of bone-black for the purifying and refining of sirups and sugar, it after a time becomes so saturated with the free lime used for their defecation, that it loses all power of absorbing this lime, or of neutralizing its alkaline causticity, which latter is highly injurious to the color of the sugar, and hence in that condition becomes worthless to the sugar-refiner, unless its original properties could be restored.

With this object in view, we are aware that a number of processes have been devised, but all of these have proved to be more or less ineffective or too costly to be brought into practical use; among which we are aware that the exhausted bone-black has been treated with a solution of phosphate of lime, having one equivalent of lime, for a very few moments, the solution being then instantly drawn off, and the bone-black again used without further treatment in the filtering of the sirups, a process, which to any one conversant with the subject, will be seen to be entirely insufficient for the purpose. Hence, while we use the superphosphate of lime as one of the means of revivification, we do not claim it as used in that manner so far as time is concerned, but only when used in the manner to be hereinafter described, and then only when the bone-black so treated is afterward subjected to calcination.

Again, bone-black, on being used for the refining of sirups and sugars, becomes exhausted but in a much slower degree, in this, that it loses, after a time, its power to absorb organic matters foreign to the sugar contained in the sirups, &c., and which it is as essential should be eliminated from the sirups as the free lime and other materials which may be used in their defecation, that the refined sugars may possess that delicacy of color and purity of taste so requisite for a first-class article. To provide a remedy for this evil, constitutes the second branch of our invention.

Our invention therefore consists of two distinct processes, which may or not be conducted separately at different times, or continuously, one immediately after the other, as circumstances may dictate; that is to say, separately where only one kind of revivification is required, and continuously where both kinds are required, the two processes, in that case, being carried on and completed previously to the common termination of both, calcination.

To enable others skilled in the art to use our improvements, we will now proceed to describe them in detail, commencing with the process for enabling the bone-black to absorb and neutralize the free lime.

The exhausted-bone-black is first thoroughly washed with pure water, to remove as much organic matter and other impurities as possible, and then steeped in a solution of superphosphate of lime, in a wooden or other suitable vessel, for about twelve hours. This bath consists of from one to twenty-five pounds of the solution of superphosphate to every one hundred pounds of the bone-black, as the necessity of the case may seem to require, a sufficiency of water being then added to cover the black with liquid, the whole being then well stirred and allowed to digest for about twelve hours.

In this connection it may be proper to state that the quantity of superphosphate required will depend, first, on the strength of the solution used; and secondly, on the quantity of free lime that it is desirable to neutralize, and which the workmen, by handling the bone-black and observing its power after it has been recalcined, speedily become expert in regulating.

The bone-black having been thus steeped in this solution for twelve hours, or thereabouts, the liquid is drawn off, and the former then dried and calcined in any approved manner, when it is again fit for use in the same manner as fresh bone-black, its powers of absorbing free lime having been restored it, and may be used many times successively before the lime will again accumulate to such extent as to render a repetition of the process necessary, although this will necessarily much depend on the kind of sugars worked and defecators used.

The place of the superphosphate of lime in neutralizing the excess of lime, in our process, may be supplied by the application of a solution of phosphoric acid, the subsequent treatment of the bone-black being the same as in the former case, and this acid, in that connection, we claim as an equivalent of the former, although its high cost, at present, forms a serious objection to its more extended use.

The superphosphate of lime used for the purposes above stated may be prepared by any approved process. That which we commonly adopt is to place in a cask capable of holding, say one hundred gallons, seventy-five pounds of oil of vitriol, previously diluted with thirty gallons of water and then adding, by degrees, one hundred pounds of finely-powdered bone-black or burned bones. This operation will consume or take some twelve hours, during which time the whole is well stirred and the cask filled with water, stirring the while, after which the sediment, consisting of sulphate of lime and impurities, is allowed to subside. The clear solution then constitutes the superphosphate of lime, which is then ready to be drawn off for use, as above, when a second but weaker solution may be obtained, by adding fresh water to the sediment, and thoroughly stirring the whole together, allowing the sediment again to subside, and drawing it off as before.

This solution can also be used like the first, but account must be made of its dilute condition on treating the inert bone-black with it.

In relation to the second process, the (method of removing organic matters from exhausted black,) the inventors are aware of its comparative rare occurrence of the excess of organic substances deteriorating the black in sugar-houses as lime does, and in most cases this process will not be necessary. When this process is required, the inventors proceed thus:

After the bone-black has been washed with water, or steeped in the solution of superphosphate of lime, it is drained and steeped in a dilute solution of the nitrate of ammonia, the proportions employed being for one hundred pounds of the bone-black, placed in a cask and covered with water, from one to ten pounds of a strong solution of the nitrate of ammonia are added, and the whole allowed to stand for twelve hours. The black is then drained and reburned.

The solution of nitrate of ammonia is made by placing in an earthen or wooden vessel (earthen preferred) twenty pounds of the carbonate of ammonia and ten gallons of water, then gradually adding a sufficiency of nitric acid to neutralize the carbonate of ammonia, the carbonic-acid gas of which escapes with considerable effervescence, the nitric acid replacing that body in the carbonate of ammonia, and in this state forming a solution of the nitrate of ammonia.

What we claim as new, and desire to secure by Letters Patent, is—

1. The process herein described of neutralizing the excess of lime in bone-black resulting from its previous use in the refining of sirups and sugar, by first digesting or steeping it in a solution of superphosphate of lime or phosphoric acid, as described, and afterward subjecting it to the process of calcination, for the purposes set forth.

2. The process herein described of removing excess of organic matters in bone-black, resulting from its previous use in the refining of sirups and sugar, by steeping it in a solution of nitrate of ammonia, as described, and afterward subjecting it to the process of calcination, for the purposes set forth.

3. The combined processes herein described, whereby previously exhausted bone-black is rendered capable of again neutralizing and absorbing both the free lime and organic matters contained in but foreign to the raw sugars and sirups being refined, or in the matters used for their defecation, as set forth.

JOHN ROGERS.
LAURENCE REID.

Witnesses:
G. D. J. TRASK,
P. L. SMITH.